(12) United States Patent
Mimassi

(10) Patent No.: US 11,017,401 B1
(45) Date of Patent: May 25, 2021

(54) PREDICTIVE PRE-AUTHORIZATION OF TRANSACTIONS USING PASSIVE BIOMETRICS

(71) Applicant: RockSpoon, Inc., San Jose, CA (US)

(72) Inventor: Nagib Georges Mimassi, Palo Alto, CA (US)

(73) Assignee: RockSpoon, Inc., San Jose, CA (US)

( * ) Notice: Subject to any disclaimer, the term of this patent is extended or adjusted under 35 U.S.C. 154(b) by 0 days.

(21) Appl. No.: 17/147,284

(22) Filed: Jan. 12, 2021

Related U.S. Application Data

(63) Continuation-in-part of application No. 16/950,101, filed on Nov. 17, 2020, which is a continuation-in-part of application No. 17/005,038, filed on Aug. 27, 2020, which is a continuation-in-part of application No. 16/796,342, filed on Feb. 20, 2020, now Pat. No. 10,803,442.

(60) Provisional application No. 62/938,817, filed on Nov. 21, 2019, provisional application No. 62/964,413, filed on Jan. 22, 2020, provisional application No. 62/964,422, filed on Jan. 22, 2020, provisional application No. 63/091,994, filed on Oct. 15, 2020.

(51) Int. Cl.
*G06Q 20/40* (2012.01)
*G06Q 20/32* (2012.01)
*G06F 16/23* (2019.01)

(52) U.S. Cl.
CPC ... *G06Q 20/40145* (2013.01); *G06F 16/2379* (2019.01); *G06Q 20/3227* (2013.01)

(58) Field of Classification Search
CPC ......... G06Q 20/40; G06Q 20/32; G06F 16/23
See application file for complete search history.

(56) References Cited

U.S. PATENT DOCUMENTS

| | | | |
|---|---|---|---|
| 6,519,576 B1 | 2/2003 | Freeman | |
| 8,880,434 B2 | 11/2014 | Bemmel et al. | |
| 2009/0132347 A1* | 5/2009 | Anderson | G06Q 30/02 705/14.52 |
| 2014/0201080 A1 | 7/2014 | Just | |
| 2019/0073647 A1* | 3/2019 | Zoldi | G06Q 20/4016 |

* cited by examiner

*Primary Examiner* — Scott S Trotter
(74) *Attorney, Agent, or Firm* — Brian R. Galvin; Galvin Patent Law LLC

(57) ABSTRACT

A system and method for predictive pre-authorization of transactions using biometrics which uses wireless mobile devices and biometric scanning to automatically predict pre-authorized transaction amounts in a secure manner without requiring the customer to handle his or her mobile device. The system and method uses a payment facilitation device at the business location which automatically detects and recognizes registered mobile devices, displays a photo of the customer to a business employee for identity confirmation, verifies the customer with a biometrics verification database, generates a pre-authorization amount with an authorization generator, and automatically deducts payments for purchases from a pre-authorized customer account.

4 Claims, 18 Drawing Sheets

901 Each customer mobile device shows nearby customer devices also using the payment system 902 Customers dining together form a group by selecting one another (or accepting a group formation created by one or more of them)

903 Each customer's device displays a copy of the itemized bill on one side of the screen, and a photo (or other representational image) of each other customer in the group on the other side of the screen 904 One or more of the customers in the group assigns payment by clicking and dragging items from the itemized bill to the photo (or image) of the customer responsible for paying for that item 905 When the group is finished assigning payments, each customer approves his/her proposed payment assignments, with unassigned items being distributed equally among the customers in the group 906 After all customers in the group have approved their payment assignments, the payment system processes payments from each customer's account according to the approved payment assignments

Fig. 9

PREDICTIVE PRE-AUTHORIZATION OF TRANSACTIONS USING PASSIVE BIOMETRICS

CROSS-REFERENCE TO RELATED APPLICATIONS

| Application No. | Date Filed | Title |
|---|---|---|
| Current application | Herewith | SYSTEM AND METHOD FOR THIRD-PARTY FOOD AND DINING ORDERING CONTROL |
| | | Claims benefit of, and priority to: |
| 63/091,994 | Oct. 15, 2020 | PREDICTIVE PRE-AUTHORIZATION OF TRANSACTIONS USING PASSIVE BIOMETRICS |
| | | and is also a continuation-in-part of: |
| 16/950,101 | Nov. 17, 2020 | ZERO-STEP AUTHENTICATION OF TRANSACTIONS USING PASSIVE BIOMETRICS |
| | | Claims benefit of, and priority to: |
| 62/964,422 | Jan. 22, 2020 | ZERO-STEP AUTHENTICATION OF TRANSACTIONS USING PASSIVE BIOMETRICS |
| | | and is also a continuation-in-part of: |
| 17/005,038 | Aug. 27, 2020 | SYSTEM AND METHOD FOR THIRD-PARTY FOOD AND DINING ORDERING CONTROL |
| | | which claims benefit of, and priority to: |
| 62/964,413 | Jan. 22, 2020 | SYSTEM AND METHOD FOR THIRD-PARTY FOOD AND DINING ORDERING CONTROL |
| | | and is also a continuation-in-part of: |
| 16/796,342 Patent 10,803,442 | Feb. 20, 2020 Issue Date Oct. 13, 2020 | ZERO-STEP AUTHENTICATION USING WIRELESS-ENABLED MOBILE DEVICES |
| | | which claims benefit of, and priority to: |
| 62/938,817 | Nov. 21, 2019 | ZERO-STEP AUTHENTICATION USING WIRELESS-ENABLED MOBILE DEVICES | the entire specification of each of which is incorporated herein by reference.

BACKGROUND

Field of the Art

The disclosure relates to the field of payment systems, and more particularly to the field of automated payment systems using wireless-enabled mobile devices.

Discussion of the State of the Art

Wireless mobile computing devices (e.g., smartphones) have enabled wireless payment technologies wherein the consumer makes a payment by receiving a payment request on the customer's mobile device and authorizing the payment by tapping an icon on the screen. However, such technologies require the customer to remove his or her mobile device from a pocket or bag, turn on the device, enter a passcode to open the device, and tap on the screen to approve payment or scan a QR code shown on the screen. These steps are inefficient and interfere with the business/customer interaction, as the customer's attention is focused on his or her mobile device instead of the interaction with the business environment or the business' employees. These systems do not provide touchless payments with sufficient security, are not compatible with existing business methodologies and cultures, and interfere with the business/customer interaction. Further, biometric security in the field of mobile devices frequently relies on fingerprint analysis or, again, requires users to pull out their phones to scan their faces, further interfering with the business/customer interaction. Additionally, when pre-authorizations are used, the pre-authorization places a temporary hold on the customer's credit card for some amount which blocks the customer from using those funds for other purposes, even if the entirety of the pre-authorized amount is not necessary to complete the transaction, unnecessarily inconveniencing the customer.

What is needed is a system and method for touchless payments that does not require the customer to handle his or her mobile device, which provides sufficient security, which is compatible with existing business methodologies and cultures, which integrates seamless biometric verifications, which supports predictive pre-authorization of transactions, and which does not interfere with the business/customer interaction.

SUMMARY

Accordingly, the inventor has conceived and reduced to practice, a system and method for predictive pre-authorization of transactions using biometrics which uses wireless mobile devices and biometric scanning to automatically authorize transaction amounts in a secure manner without requiring the customer to handle his or her mobile device. The system and method uses passive biometrics and a payment facilitation device at the business location which automatically detects and recognizes registered mobile devices, displays a photo of the customer to a business employee for identity confirmation, verifies the customer with a biometrics verification database, generates a pre-authorization amount with a authorization generator, and automatically deducts payments for purchases from a pre-authorized customer account. The customer account is managed by a payment processing server, which stores the customer account data, makes appropriate deductions, sends confirmation of deductions to the customer's mobile device, and automatically refills the customer's account by making pre-authorized charges to the customer's banking institution. Biometric data is handled by a biometrics verification server which handles storage and comparison of basic biometric data such as voice files and facial data. Predictive pre-authorization is coordinated by an authorization generator which stores restaurant ticket data, customer ticket data, and customer account preferences to generate a pre-authorized transaction amount.

According to a preferred embodiment, a system for predictive pre-authorization of transactions using biometrics is disclosed, comprising: a computing device comprising a memory, a processor, and a non-volatile data storage device; a customer information database on the non-volatile data storage device, the database comprising customer history data, the customer history data comprising customer receipt data, bank, debit, or credit card details, and customer preferences; a business enterprise database on the non-volatile data storage device, the database comprising business enterprise sales data; a biometrics verification module comprising a first plurality of programming instructions stored in the memory, and operating on the processor, wherein the first plurality of programming instructions, when operating on the processor, cause the computing device to: receive audio data, or video data, or both; match received audio data, or video data, or both with stored biometric data to confirm an identity of a specific customer; and send a confirmation of identity signal to an authorization generator; and an authorization generator module comprising a first plurality of programming instructions stored in the memory, and operating on the processor, wherein the first plurality of programming instructions, when operating on the processor, cause the computing device to: receive the confirmation of identity signal from the biometrics verification module; retrieve a subset of the customer history data from the customer database that corresponds to the specific customer; retrieve a subset of the business enterprise sales data from the business enterprise database; compute a customer average transaction amount using the customer receipt data from the subset of the customer history data; compute a business average transaction amount using the business enterprise sales data; and determine, using a machine-learned predictive algorithm, a pre-authorization amount using the customer average transaction amount, the business average transaction amount, and the customer preferences from the subset of the customer history data as inputs into the machine-learned predictive algorithm.

According to another preferred embodiment, a method for predictive pre-authorization of transactions using biometrics is disclosed, comprising the steps of: storing customer information in a database, the customer information comprising: a list of registered wireless mobile devices; a device identifier for each registered wireless mobile device; a photograph of a customer associated with each registered wireless mobile device; and payment details for the customer associated with each registered wireless mobile device; and performing the following steps using a biometrics verification module, the payment facilitation device comprising a first memory, a first processor, and a first plurality of programming instructions: receiving audio data, or video data, or both; matching received audio data, or video data, or both with stored biometric data to confirm an identity of a specific customer; and sending a confirmation of identity signal to an authorization generator; and performing the following steps using an authorization generator module, the payment facilitation server comprising a second memory, a second processor, and a second plurality of programming instructions: receiving the confirmation of identity signal from the biometrics verification module; retrieving a subset of the customer history data from the customer database that corresponds to the specific customer; retrieving a subset of the business enterprise sales data from the business enterprise database; computing a customer average transaction amount using the customer receipt data from the subset of the customer history data; computing a business average transaction amount using the business enterprise sales data; and determining, using a machine-learned predictive algorithm, a pre-authorization amount using the customer average transaction amount, the business average transaction amount, and the customer preferences from the subset of the customer history data as inputs into the machine-learned predictive algorithm.

According to an aspect of an embodiment, a unified communications system is used as a common intermediary device through which the payment facilitation device, the payment facilitation server, and registered wireless mobile device communicate.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 9 is a flow diagram showing the steps of an exemplary method for bill splitting among customers.

DETAILED DESCRIPTION

Figure 1:
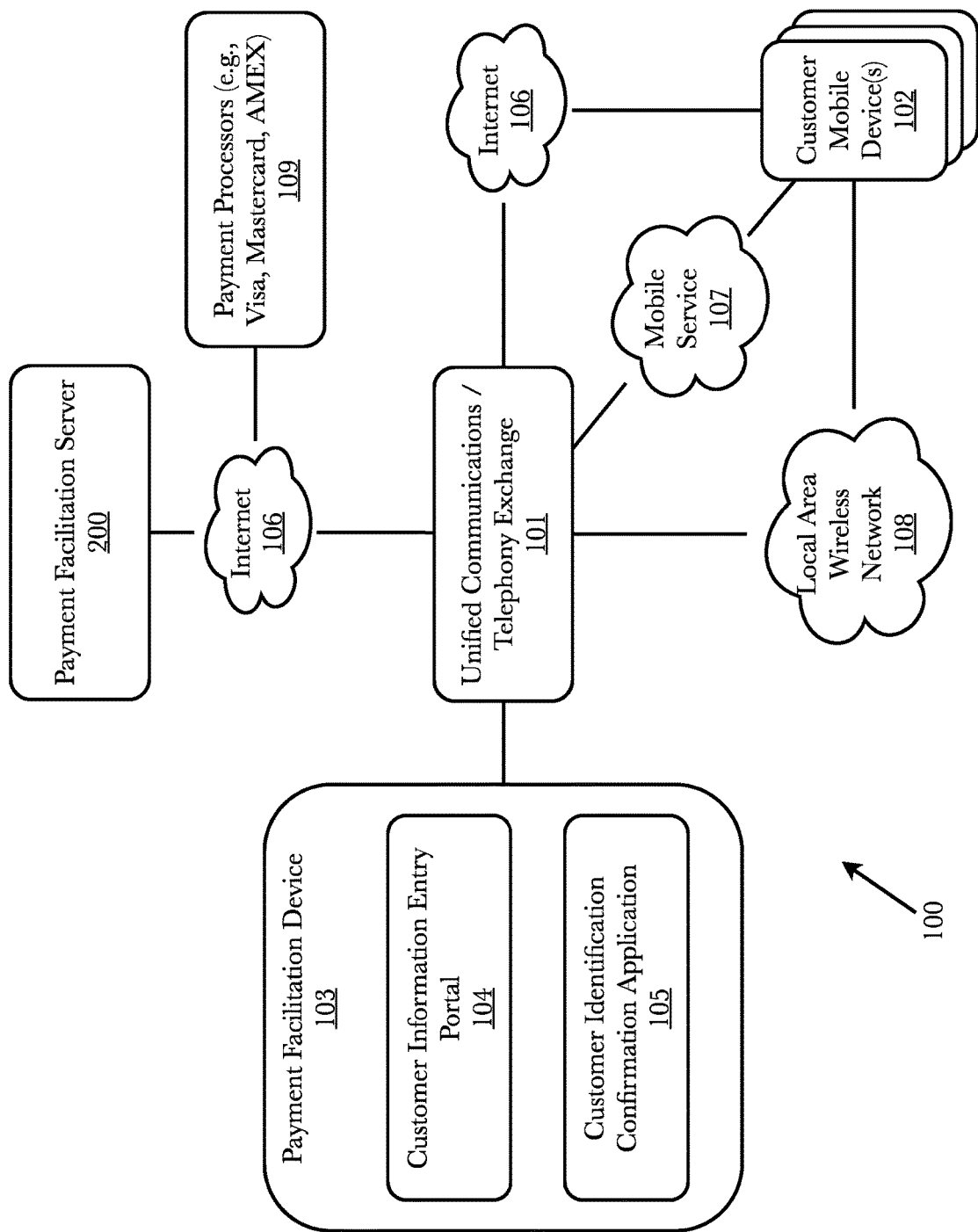
FIG. 1 is a block diagram illustrating an exemplary system architecture for a zero-step authentication system.

The inventor has conceived, and reduced to practice, a system and method for predictive pre-authorization of transactions using biometrics which uses wireless mobile devices and biometric scanning to automatically predict pre-authorize transaction amounts in a secure manner without requiring the customer to handle his or her mobile device. The system and method uses a payment facilitation device at the business location which automatically detects and recognizes registered mobile devices, displays a photo of the customer to a business employee for identity confirmation, verifies the customer with a biometrics verification database, generates a pre-authorization amount with an authorization generator, and automatically deducts payments for purchases from a pre-authorized customer account. The customer account is managed by a payment processing server, which stores the customer account data, makes appropriate deductions, sends confirmation of deductions to the customer's mobile device, and automatically refills the customer's account by making pre-authorized charges to the customer's banking institution. Biometric data is handled by a biometrics verification server which handles storage and comparison of basic biometric data such as voice files and facial data. Predictive pre-authorization is coordinated by an authorization generator which retrieves business enterprise data, and customer information data to generate a pre-authorized transaction amount.

The authorization generator uses the stored data to closely predict the total transaction amount so that only the amount that is required to complete the transaction is pre-authorized. This limits the amount of the customer account that needs to be put on hold to complete the transaction which means more of the customer's money is left available.

In a typical scenario, the customer enters a business establishment with a customer mobile device which has an application and a connected payment method (bank card, debit card, credit card) stored within the application. The customer undergoes passive biometric scanning that identifies and authenticates the customer. Upon identification and authentication, the customer is automatically authorized for the amount of an average ticket at a restaurant. The waiter will verify the customer identity and will see that the customer is pre-authorized for an amount, and is free to place an order. If the customer exceeds the pre-authorized amount, then incremental authorization may occur according to customer defined account preferences in the application. For example, a regular customer who normally orders an entree and a glass of wine for dinner will be pre-authorized for an amount that will cover the costs of his typical ticket, but on a certain evening the customer also orders a desert. The system will recognize the anomaly and may automatically increment his pre-authorization amount by $10 as was defined in his account preferences. If the customer has visited the restaurant before and there is customer history data available, then the customer will be pre-authorized for an amount based on the customer's average ticket amount relative to the restaurant's average ticket amount. After the customer finishes the meal, he or she may stand up to leave without interacting with the restaurant staff. The restaurant staff knows which customers are allowed to get up and leave because customers without the application won't show up on the mobile device of the waiter, whereas pre-authorized customers will. When the customer leaves the restaurant, the pre-authorized amount is converted to a charge and the customer's account is charged for the bill. Other embodiments are possible. For example, if the customer does not have the application, but the restaurant has cameras installed on the system, the customer can be identified with facial recognition and predictive pre-authorization can still occur without any interaction, assuming the customer is registered with the system.

In another typical scenario, prior to arriving at the restaurant the customer may use the application to specify who in a party the customer will be paying for. When this happens, orders are by tables and seats. When the customer arrives to the restaurant, the waiter will see the customer's face on her mobile device and drag the customer's face to table five. The customer may declare he is paying for seats one to three at table five, and whatever is ordered to the customer's "covered seats" will be charged to him when he leaves the restaurant.

The customer may have multiple payment cards connected with the application. One card is selected as the default card. If the customer decides to switch cards mid-meal, then the predictive pre-authorization process is repeated using the new switched card. If the default card does not have a sufficient balance to support the pre-authorized amount, then the system can switch to a different card. If neither card has a sufficient balance, then the pre-authorization may be split between them. For example, if a customer has a corporate card and a personal card connected to the system, and the customer exceeds corporate limits (e.g. alcohol), then those items will automatically be charged to the customer's personal card. Additionally, the system may support a parental card with limits (parent will only pay for X, or only pay for X amount), and the student card takes the rest of the charge.

If the card and phone do not match face recognition then the system may prevent display of the customer's image on the waiter's mobile device, and an alert may be sent to the card owner unless an exception has been established. Exceptions may be established by patterns of conduct (e.g. couple that regularly dines together) or by explicit permission previously provided by the card owner. In the case of an exception, the waiter may identify the customer visually and drag accordingly. For example, a customer and his wife often dine together using the husband's application account on his mobile device. If the wife was to come in by herself for a meal, then the waiter would find her picture as an exception under her husband's account, and the waiter could recognize her and drag her picture to authenticate her identity and initialize the predictive pre-authorization process using her husband's account information.

While the examples herein primarily discuss authorization of payments, the invention is not limited to authorization of monetary transactions, and can be used for authorization and transfer of any asset, or representation of an asset, that can be transferred electronically, for example: electronic transfers of real currency (credit card charges, bank transfers and payments, etc.), transfers of blockchain-based currencies such as Bitcoin, and transfers of digitized contracts or promises to pay or transfer physical assets (including, but not limited to, IOUs, certificates of ownership of stocks or other securities, and deeds for real estate).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a business without a physical location such as an online or telephone order retailer. Many examples herein use a restaurant as the business establishment, but the invention is not limited to use in restaurants, and is applicable to any business establishment.

The term "network" as used herein means any communication connection between two or more computing devices, whether such connection is made directly (e.g., from one device containing a Bluetooth radio to another device containing a Bluetooth radio) or through an intermediary device such as a router, where a number of devices connected to the router may all communicate with one another.

Conceptual Architecture

FIG. 1 is a block diagram illustrating an exemplary system architecture 100 for a zero-step authentication system. The primary components of the system are a payment facilitation device 103, a unified communications device or telephony exchange system (UC system) 101, and a payment facilitation server 200. Components or services that may connect to or be accessed by the system include wireless customer mobile devices 102, and payment processors 109. The payment facilitation device 103 is a computing device located at a business establishment that is connected (wired or wirelessly) to a UC system 101. The payment facilitation device 103 may be wired, or wireless, or both, depending on the implementation of a given embodiment. While a payment facilitation device 103 and UC system 101 are specified in this embodiment, it is not required that they be precisely in this configuration, and other configurations are possible, including a non-SIP computing device connected to a network without a UC system 101. The payment facilitation device 103 comprises a screen (not shown) and applications for a customer information entry portal 104 and a customer identification confirmation application 105. The payment facilitation device 103 may be a mobile computing device like a mobile phone or tablet computer or may be a desktop or tabletop computing device.

The customer information entry portal 104 is an application on the payment facilitation device 103 that allows an employee of the business to enter customer details such as name, telephone number, device identifier, bank, debit, or credit card details, payment preferences, and, if necessary, customer account refill limits and customer account refill amounts. The device identifier may be any information that allows the system to identify the customer mobile device 102, including, but not limited to, a mobile access control (MAC) address (e.g., a MAC address for the device's WiFi radio, a MAC address for the device's Bluetooth radio, etc.), the device's 102 serial number, the device's mobile equipment identifier (MEID) or international mobile equipment identity (IMEI) number, the integrated circuit card identifier (ICCID) of the subscriber identity module (SIM) card inserted into the customer mobile device 102, and the device's 102 secure element identification (SEID) number.

The customer identification and confirmation application 105 is an application that provides security in financial transactions by allowing the employee of the business to visually confirm the identity of the customer making a transaction. For example, the payment facilitation device at a particular business location may be connected to multiple customer devices simultaneously. The customer identification and confirmation application 105 may display a photo of the user (customer) of each such connected customer device, and the employee may select the device of the customer making the transaction by clicking on the customer's photo as displayed by the customer identification and confirmation application 105 on the payment facilitation device 103.

The UC system 101 is a device or service (e.g., online service) that integrates different methods of communication (e.g., phone calls, video calls, short message service (SMS), instant messaging (chat), email) and allows for all of those different methods of communication to be accessed through a computing device such as a mobile phone or tablet computer. A UC system 101 is the modern, and much more flexible and powerful, form of a private branch exchange (PBX) telephone equipment system that allowed businesses to connect multiple internal telephones to a single incoming telephone line. In this example, the UC system 101 acts as the interface between the payment facilitation device 103, the customer mobile devices 102, and the payment facilitation server 200.

A customer mobile device 102 may be connected to the system via any wireless network connection, for example through the Internet 106, a mobile (cellular) network 107, or through a local wireless network 108 such as WiFi, Bluetooth, etc. In the case of remote connections such as those made through the Internet 106 or mobile service 107, the location of a customer mobile device 102 and its location relative to the payment facilitation device 103 or other customer mobile devices 102 may be established through use of the device's satellite positioning system hardware (e.g., GPS, GLONASS, Galileo), by identifying the location of an intermediary device to which the device is connected (e.g., a WiFi router, etc). In the case of local connections, which typically use short range wireless transmissions, it may not be necessary to determine the location of the mobile customer device 102 because the short range of wireless communications establishes that the payment facilitation device 103 or other mobile customer devices are nearby. For example, when using a Bluetooth Class 2 connection to connect to other devices, it will be apparent that the other devices are nearby because Bluetooth Class 2 has an effective range on the order of 10 meters.

In a typical scenario, the first time a customer enters a business establishment with a customer mobile device 102, an employee of the business establishment will enter the customer's information using the customer information entry portal 104 and register the customer mobile device 102 using the customer mobile device's 102 identification. When a customer mobile device 102 enters a business establishment, the payment facilitation device 103 and customer mobile device 102 will automatically detect each other and establish a network connection. The payment facilitation device 103 will recognize the customer mobile device 102 using the customer mobile device's identifier. As the customer makes an order, the business's employee will confirm the identity of the customer using the customer identification confirmation application 105. The payment facilitation device connects to the payment facilitation server 200, either directly or through the UC system 101, forwards the customer information and order information to the payment facilitation server 200. The payment facilitation server 200, checks the customer's account and either deducts and appropriate amount from the customer's prepaid account or sends the payment details to a payment processor 109 for processing. Once the payment is processed, the payment facilitation server 200 sends a confirmation of the payment either to the payment facilitation device 103, the customer mobile device 102, or both. In a scenario where the customer is in a remote location from the business establishment (e.g., a phone order or online order), the process is much the same except that the first time customer information entry and mobile device registration occurs remotely, and the employee does not visually identify the customer (although other methods of identifying the customer may apply, such as personal identification number (PIN) codes, voice print identification, telephone number identification, or customer mobile device 102 identifiers).

Figure 2:
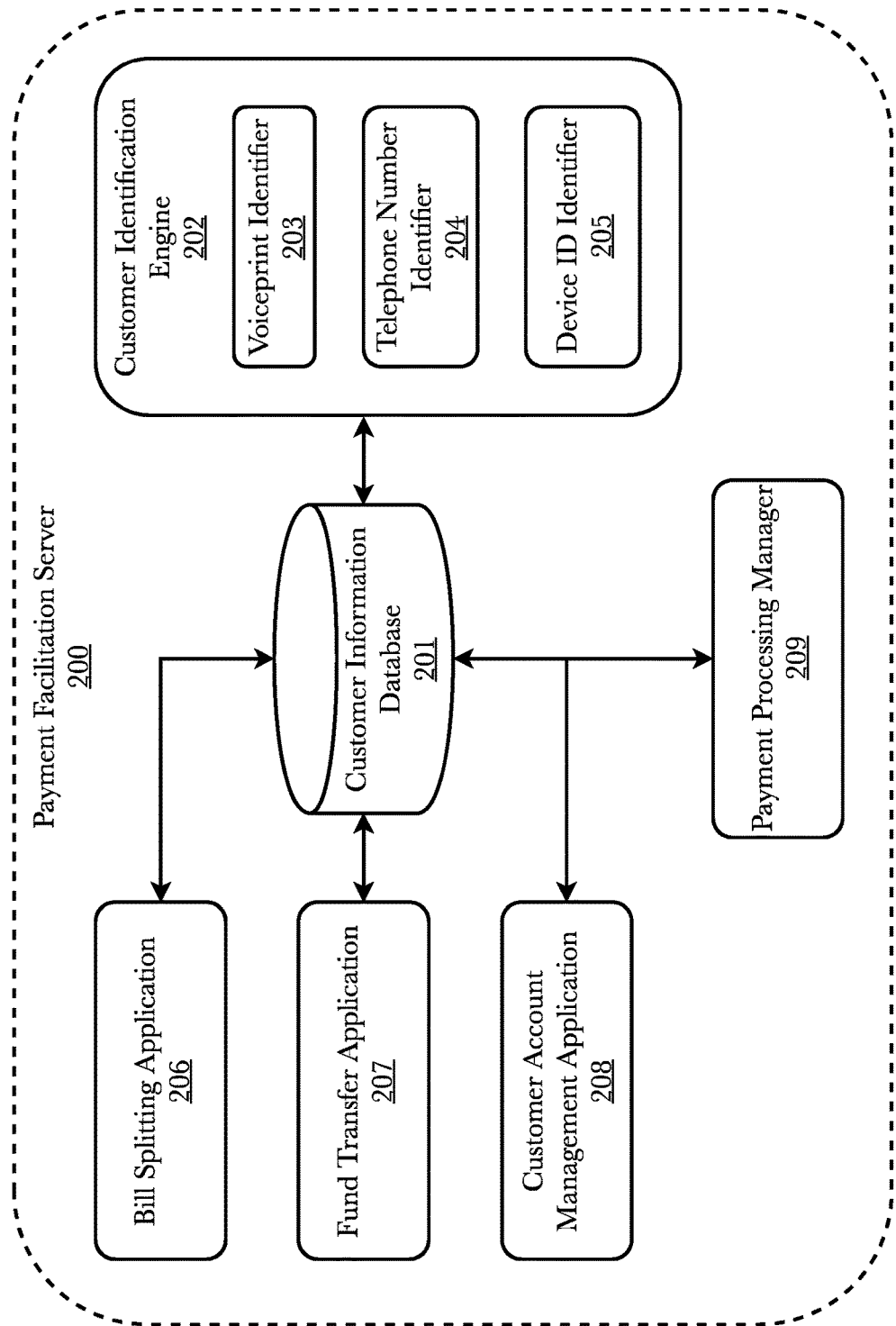
FIG. 2 is a block diagram illustrating an exemplary architecture for an aspect of zero-step authentication system, the payment facilitation server.

FIG. 2 is a block diagram illustrating an exemplary architecture for an aspect of zero-step authentication system, the payment facilitation server 200. The payment facilitation server 200 manages customer information and payments from multiple customers. In this example, the payment facilitation server comprises a customer information database 201, a customer identification engine 202, a payment processing manager 209, and one or more applications for managing bill splitting, fund transfers, and account information. Note that, in some embodiments, the bill splitting and fund transfer applications may be applications on the customer mobile device 102 instead of on the payment facilitation server 200. As the payment facilitation server receives customer information and device registrations, it stores them in a customer information database. Such customer information may comprise customer details such as name, telephone number, device identifier, bank, debit, or credit card details, payment preferences, and, if necessary, customer account refill limits and customer account refill amounts. The device identifier may be any information that allows the system to identify the customer mobile device 102, including, but not limited to, a mobile access control (MAC) address (e.g., a MAC address for the device's WiFi radio, a MAC address for the device's Bluetooth radio, etc.), the device's 102 serial number, the device's mobile equipment identifier (MEID) or international mobile equipment identity (IMEI) number, the integrated circuit card identifier (ICCID) of the subscriber identity module (SIM) card inserted into the customer mobile device 102, and the device's 102 secure element identification (SEID) number.

The customer identification engine 202 provides additional security by confirming the identity of the customer before processing payments. In this example, the customer identification engine 202 has three separate identification methods, a voiceprint identifier 203, a telephone number identifier 204, and a device ID identifier 205. The voiceprint identifier 203 can provide confirmations of customer identities either by matching voice samples of specific words and phrases provided by the customer as during account creation and device registration or, in a more sophisticated version, may match the customer's voice to any spoken words and phrases using machine learning algorithms. The telephone number identifier 204 receives caller identification (caller ID) information from the UC system 101, and verifies that the phone number from which the order is being made matches the phone number in the customer account information. The device ID identifier 205 receives a device identifier from the UC system 101 and matches it to the device identifier in the customer database 201 to confirm that the device is registered. In some embodiments, other methods of identifying the customer may be used, for example, PIN codes. In some embodiments, two or more of these identifiers may be used together to confirm the customer's identity.

As customer information and order information is received, the payment facilitation server 200 checks the customer's account using the customer account management application 208 and either deducts and appropriate amount from the customer's prepaid account or sends the payment details to the payment processing manager 209, which forwards the payment request to a payment processor 109 for processing. Once the payment is processed, the payment facilitation server 200 sends a confirmation of the payment either to the payment facilitation device 103, the customer mobile device 102, or both.

The bill splitting application 206 receives a bill that is to be shared by two or more customers (e.g., a restaurant dining bill), the device identifier of two or more customer mobile devices 102, and provides an interface for those customers to allocate items on the bill between the customers. Once each of the customers involved approves the allocation, the bill splitting application forwards each customer's portion of the bill to the payment processing manager 209 The fund transfer application 207 operates in a similar manner for fund transfers between customers. Customers involved in the fund transfer specify amounts to be transferred to other customers, and once approved by all customers involved in the fund transfer, the fund transfer application for forwards the approved funds transfers to the payment processing manager 209 for execution.

Figure 3:
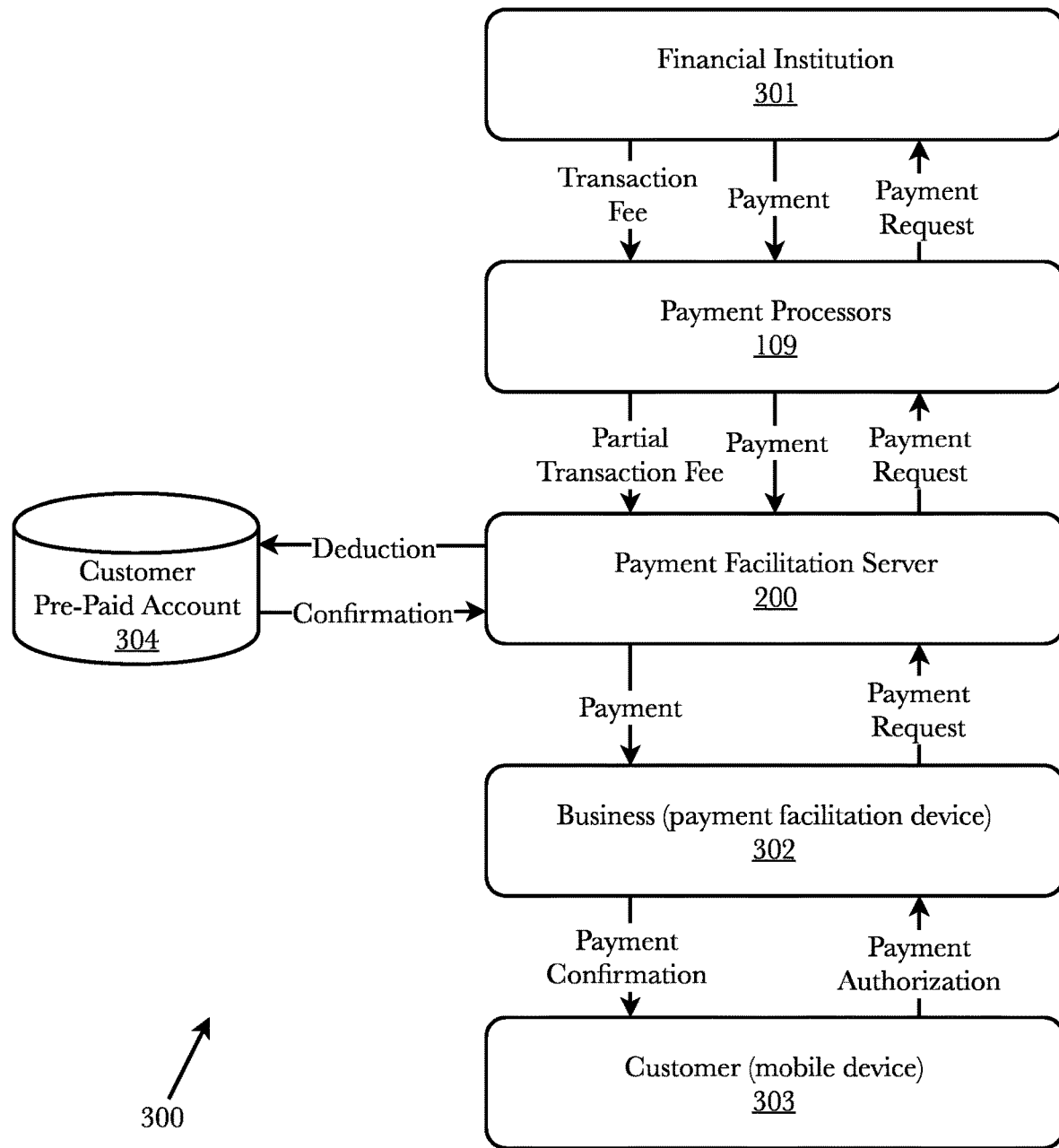
FIG. 3 is a flow diagram illustrating an exemplary flow of payments in an embodiment.

FIG. 3 is a flow diagram illustrating an exemplary flow of payments 300 in an embodiment. When a customer 303 authorizes a transaction (which authorization may be pre-approved) through his or her customer mobile device 102, the payment authorization is sent to the business 302 at the business' payment facilitation device 103. The payment facilitation device 103 of the business 302 sends a payment request to the payment facilitation server 200. The payment facilitation server 200 checks the customer's pre-paid account 304 to determine whether pre-paid funds are available. If such funds are available, a deduction is made from the customer pre-paid account 304 in the amount of the authorized payment, and a confirmation is confirmed by the payment facilitation server 200. If sufficient funds are not available in the customer pre-paid account, the account is either refilled or a direct payment request is made. In either such case, the payment facilitation server 200 sends a payment request to a payment processor 109, which are financial intermediaries like Visa and Mastercard, who process transactions on behalf of financial institutions 301 (i.e., banks). The payment processor 109 sends the payment request to a financial institution 301 at which the customer 303 has an account. The financial institution 301 receives the payment request, and sends a payment to the payment processor 109, typically along with a transaction fee. The payment processor 109 receives the payment and transaction fee, and forwards the payment to the payment facilitation server along with a portion of the transaction fee. The payment facilitation server 200 forwards the payment to the business 302, which forwards a confirmation of payment 303 to the customer, completing the transaction.

DETAILED DESCRIPTION OF EXEMPLARY ASPECTS

Figure 4:
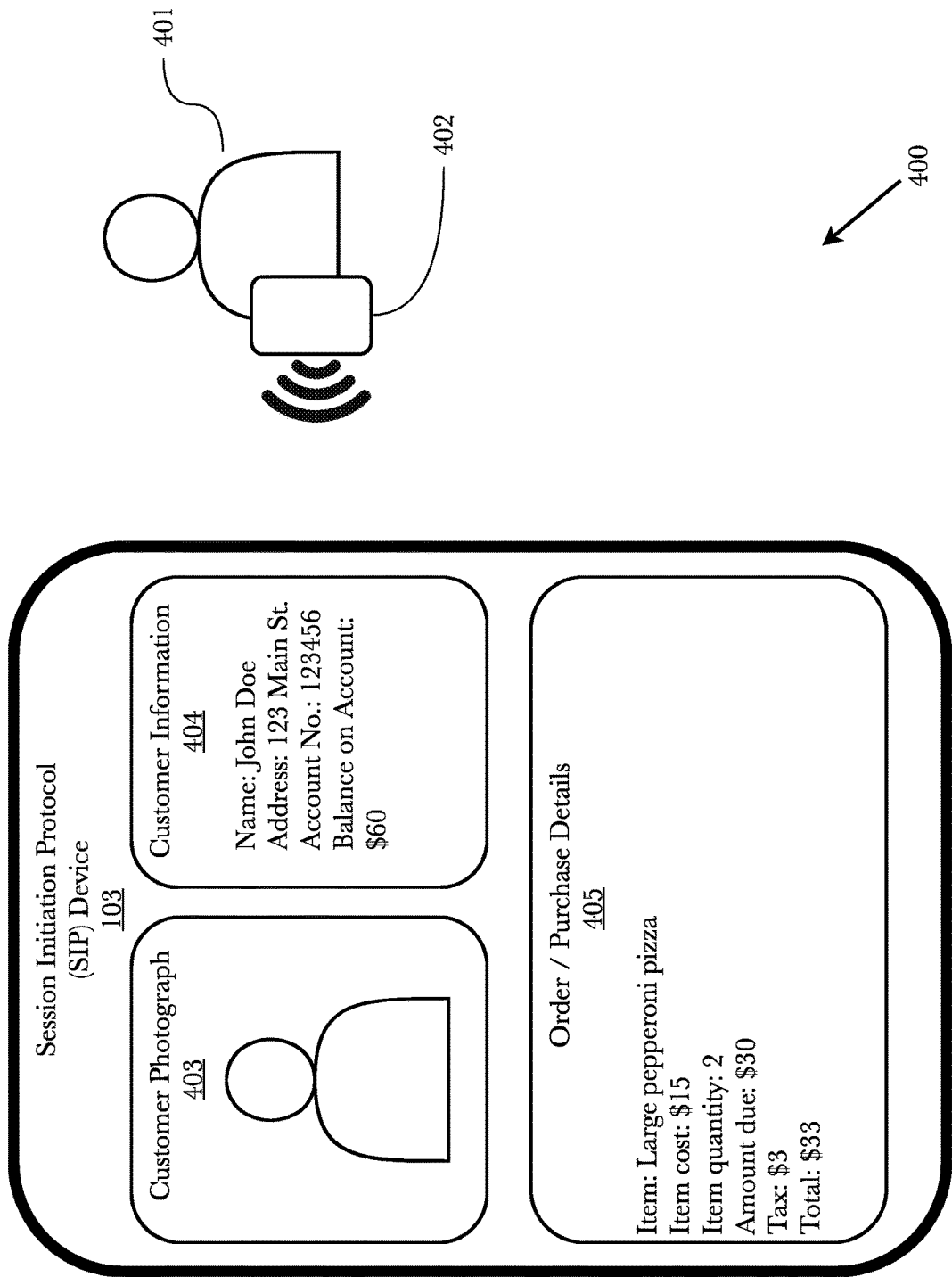
FIG. 4 is a diagram illustrating an exemplary business/customer interaction and showing an exemplary screenshot.

FIG. 4 is a diagram illustrating an exemplary business/customer interaction 400 and showing an exemplary screenshot. In this example, a customer 401 (who already has an account and registered device 402 at a business establishment) makes an order. The customer's device 402 and the payment facilitation device 103 detect each other and establish a connection when the customer 401 enters the business establishment. The customer's photograph 403 is displayed on the business' payment facilitation device 103, along with the customer's information 404 and order details 405. An employee of the business clicks on the customer photograph 403 to confirm the identity of the customer 401. Once confirmed, the customer device 402 automatically approves payment and receives confirmation of the payment without the customer having the handle the device 402. The customer device 402 may remain in the customer's pocket, purse, backpack, etc., and does not have to be removed to complete the transaction.

Figure 5:
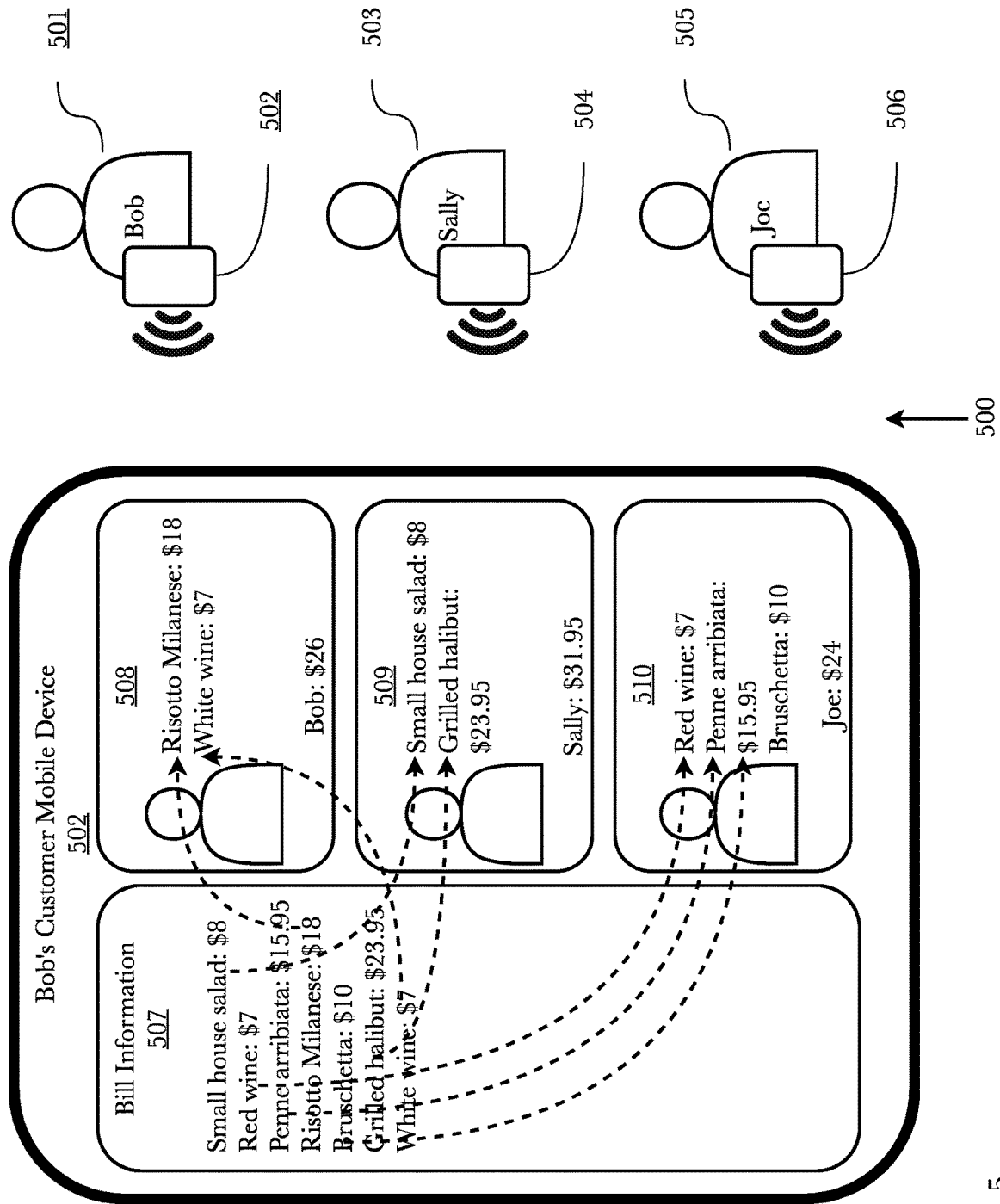
FIG. 5 is a diagram illustrating an exemplary bill splitting feature and showing an exemplary screenshot.

FIG. 5 is a diagram illustrating an exemplary bill splitting feature 500 and showing an exemplary screenshot. In this example, three customers, Bob 501, Sally 503, and Joe 505, each with their respective mobile devices 502, 504, and 506, have a meal together at a restaurant and want to split the bill among themselves. Each customer's mobile device has a bill splitting application installed on it, which shows a copy of the bill and the customers who dined together. For example, Bob's 501 mobile device 502 shows the bill information 507 for the group on the left-hand side of his screen, and a window for himself 508, a window for Sally 509, and window for Joe 510 on the right side. The mobile devices 504, 506 of Sally 503 and Joe 505 show similar screens. The windows 508, 509, 510, each show a photo (or other representation) of the customer, a space for allocating items from the bill, and a total of the items allocated to that customer. As each customer, on his or her respective mobile device 502, 504, 506, allocates food and drink items from the bill information 507 by clicking on them and dragging them to the window of a person on the right, the allocation of those food and drink items appears in the window of the person to whom the item has been allocated, as indicated by the arrows. For example, the risotto Milanese and white wine have been allocated to Bob (either by Bob or by one of the other two customers), a total due from Bob of $26 is shown, and this information is updated on all three mobile devices 502, 504, 506. Once all three customers 501, 503, 505 approve the allocation, each person's mobile device 502, 504, 506 processes the payment for the amount allocated to that customer. In some embodiments, unallocated items may be automatically split among the customers in the group.

Figure 6:
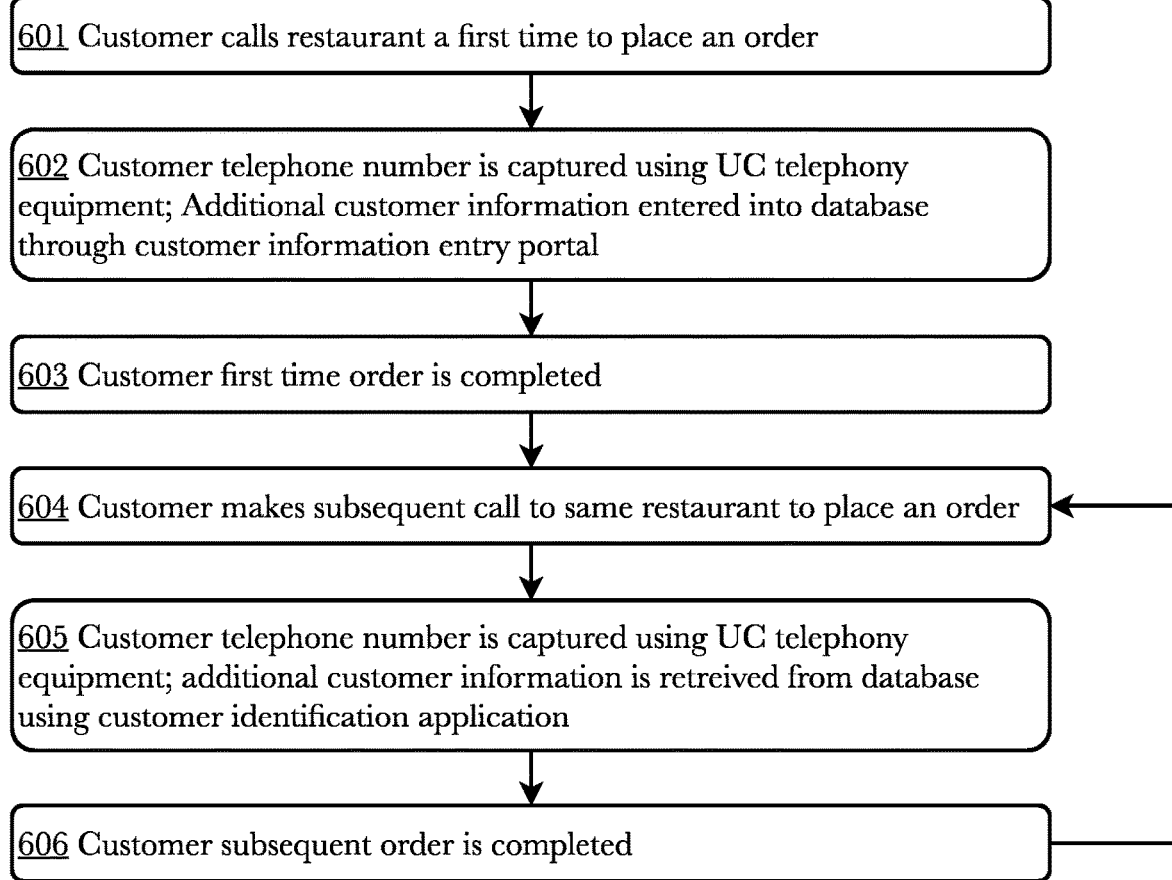
FIG. 6 is a flow diagram showing the steps of an exemplary method for registration of a customer's mobile device and order placement.

FIG. 6 is a flow diagram showing the steps of an exemplary method for registration of a customer's mobile device and order placement. When a customer calls restaurant a first time to place an order 601, the customer's telephone number is captured using UC telephony equipment, and additional customer information is gathered and entered into database by an employee of the business 602. The customer than makes his or her order and the order is completed 603. Each time the customer makes a subsequent call to same business to place an order 604, the customer's telephone number is captured using UC telephony equipment, and the customer's information is retrieved from a customer database using a customer identification application 605. The customer than makes his or her order and the order is completed 606 without the customer having to provide his or her information. The same procedure is used when a customer physically enters a business establishment, except that the registration is performed in person.

Figure 7:
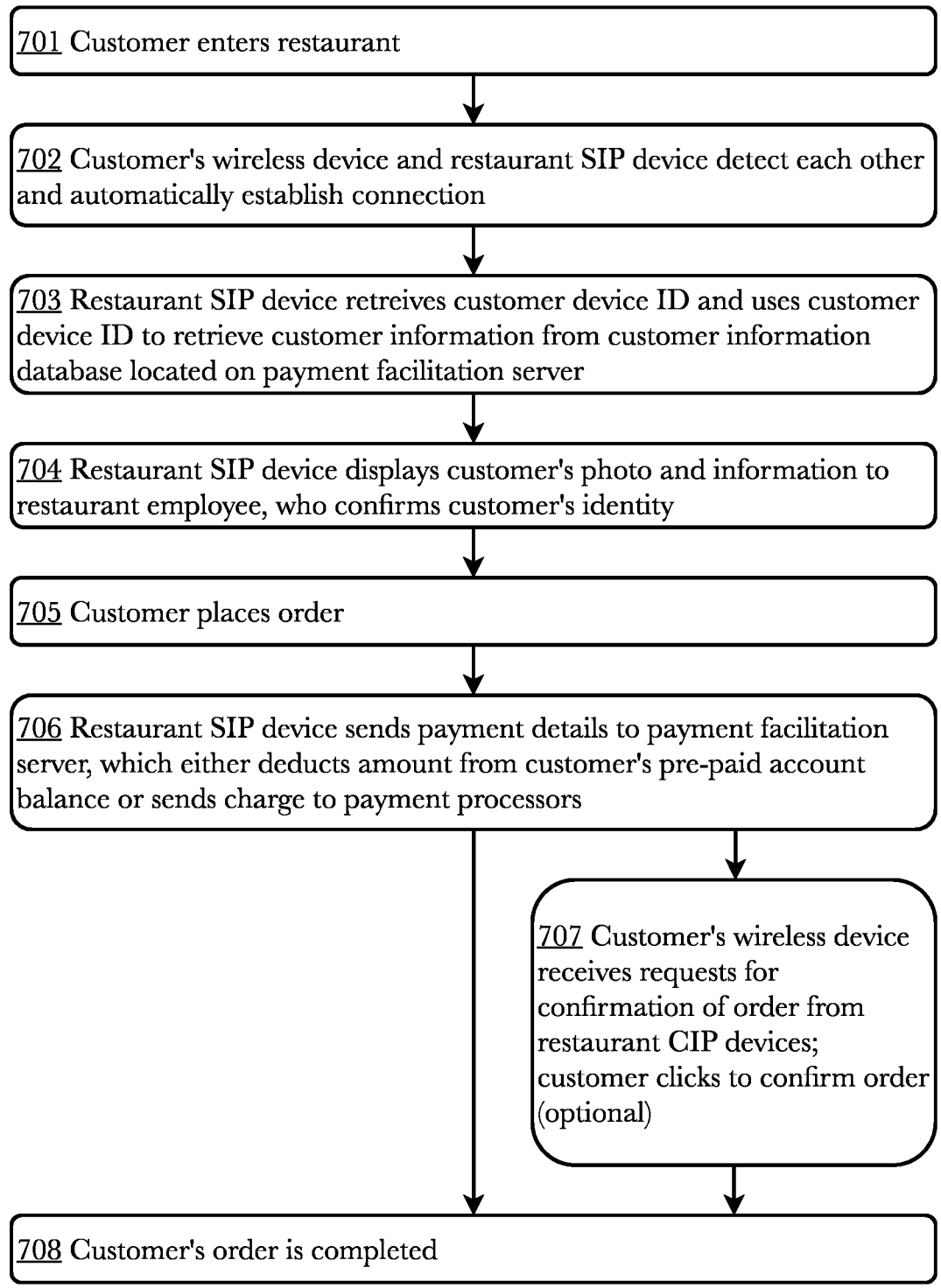
FIG. 7 is a flow diagram showing the steps of an exemplary method for zero-step authentication and completion of a transaction.

FIG. 7 is a flow diagram showing the steps of an exemplary method for zero-step authentication and completion of a transaction. When a customer enters a business establishment 701, the customer's wireless device and business payment facilitation device detect each other and automatically establish connection 702. The business payment facilitation device retrieves the customer device identifier (ID) and uses the customer device ID to retrieve customer information from customer information database located on a payment facilitation server 703. The business payment facilitation device displays customer's photo and information to a restaurant employee, who confirms customer's identity by clicking on the photo of the customer 704. The customer the places an order 705. When the order is placed, the business payment facilitation devices ends payment details to payment facilitation server, which either deducts amount from customer's pre-paid account balance or sends charge to payment processors 706. Optionally, an additional security step may be inserted wherein the customer's wireless device receives and displays a request for confirmation of the order from the business CIP device and the customer clicks on the displayed request to confirm the order 707. Finally, the customer's order is completed 708.

Figure 8:
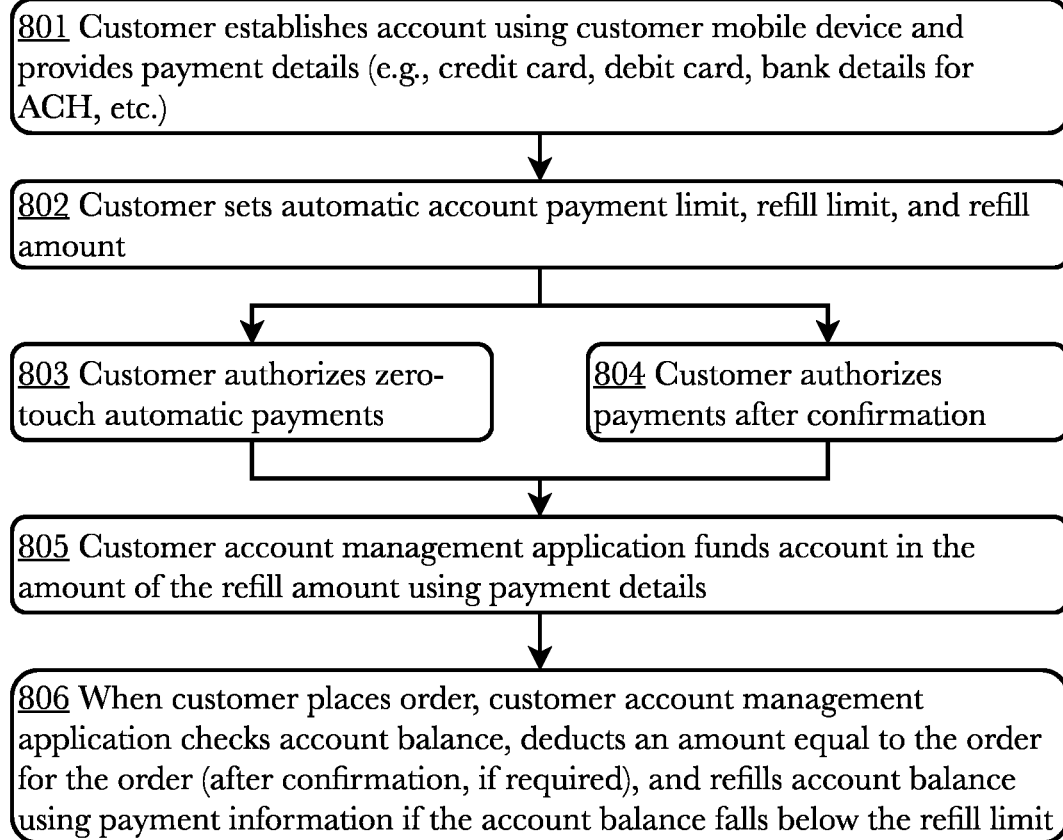
FIG. 8 is a flow diagram showing the steps of an exemplary method for establishment of an account and pre-authorization of payments.

FIG. 8 is a flow diagram showing the steps of an exemplary method for establishment of an account and pre-authorization of payments. First, a customer establishes and account using his or her customer mobile device and provides payment details (e.g., credit card, debit card, bank details for ACH, etc.) 801. The customer then sets automatic an account payment limit, a refill limit, and a refill amount 802. For example, the customer may set a payment limit for each transaction at $50, a refill limit (i.e., minimum account balance below which the account will be automatically refilled) of $10, and a refill amount of $100. The customer may choose to have such payments sent automatically without handling his or her mobile device (zero-step authentication) 803 or may choose to authorize each payment individually using his or her mobile device 804. A customer account management application funds the account in the amount of the refill amount using payment details 805. Thus, in this example, the customer has pre-authorized payments of up to $50 per transaction, and pre-authorized the system to automatically refill his account from the customer's financial institution (or credit card) in the amount of $100 whenever the account balance falls below $10. When the customer places an order, the customer account management application checks account balance, deducts an amount equal to the order for the order (after confirmation, if required), and refills account balance using payment information if the account balance falls below the refill limit 806.

FIG. 9 is a flow diagram showing the steps of an exemplary method for bill splitting among customers. Each customer mobile device runs an application that shows nearby customer devices also using the payment system 901. Customers dining together form a group by selecting one another (or accepting a group formation created by one or more of them) 902. Each customer's device displays a copy of the itemized bill on one side of the screen, and a photo (or other representational image) of each other customer in the group on the other side of the screen 903. One or more of the customers in the group assigns payment by clicking and dragging items from the itemized bill to the photo (or image) of the customer responsible for paying for that item 904. When the group is finished assigning payments, each customer approves his/her proposed payment assignments, with unassigned items being distributed equally among the customers in the group 905. After all customers in the group have approved their payment assignments, the payment system processes payments from each customer's account according to the approved payment assignments 906.

Figure 10:
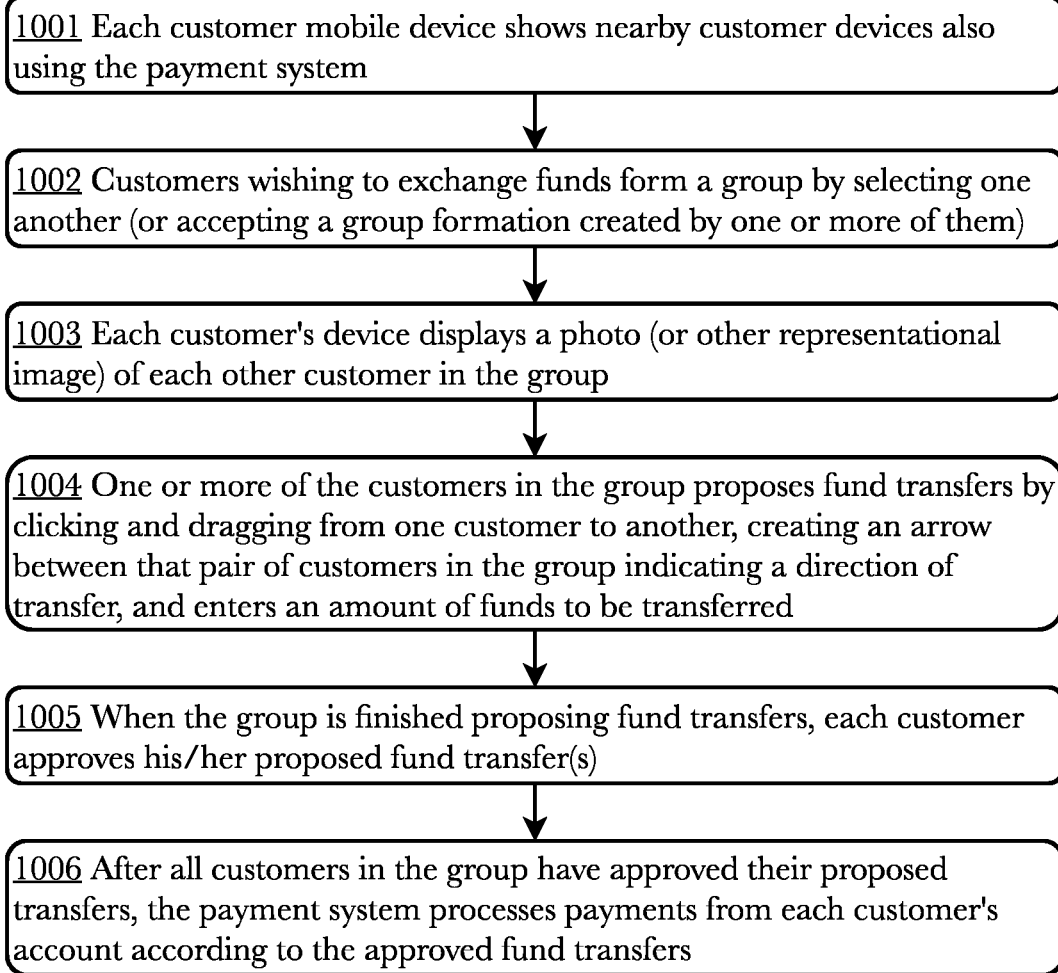
FIG. 10 is a flow diagram showing the steps of an exemplary method for funds transfer among customers.

FIG. 10 is a flow diagram showing the steps of an exemplary method for funds transfer among customers. Each customer mobile device runs an application that shows nearby customer devices also using the payment system 1001. Customers wishing to exchange funds form a group by selecting one another (or accepting a group formation created by one or more of them) 1002. Each customer's device displays a photo (or other representational image) of each other customer in the group 1003. One or more of the customers in the group proposes a fund transfer by clicking and dragging from one customer to another, creating an arrow between that pair of customers in the group indicating a direction of transfer, and enters an amount of funds to be transferred 1004. When the group is finished proposing fund transfers, each customer approves his/her proposed fund transfer(s) 1005. After all customers in the group have approved their proposed transfers, the payment system processes payments from each customer's account according to the approved fund transfers 1006.

Figure 15:
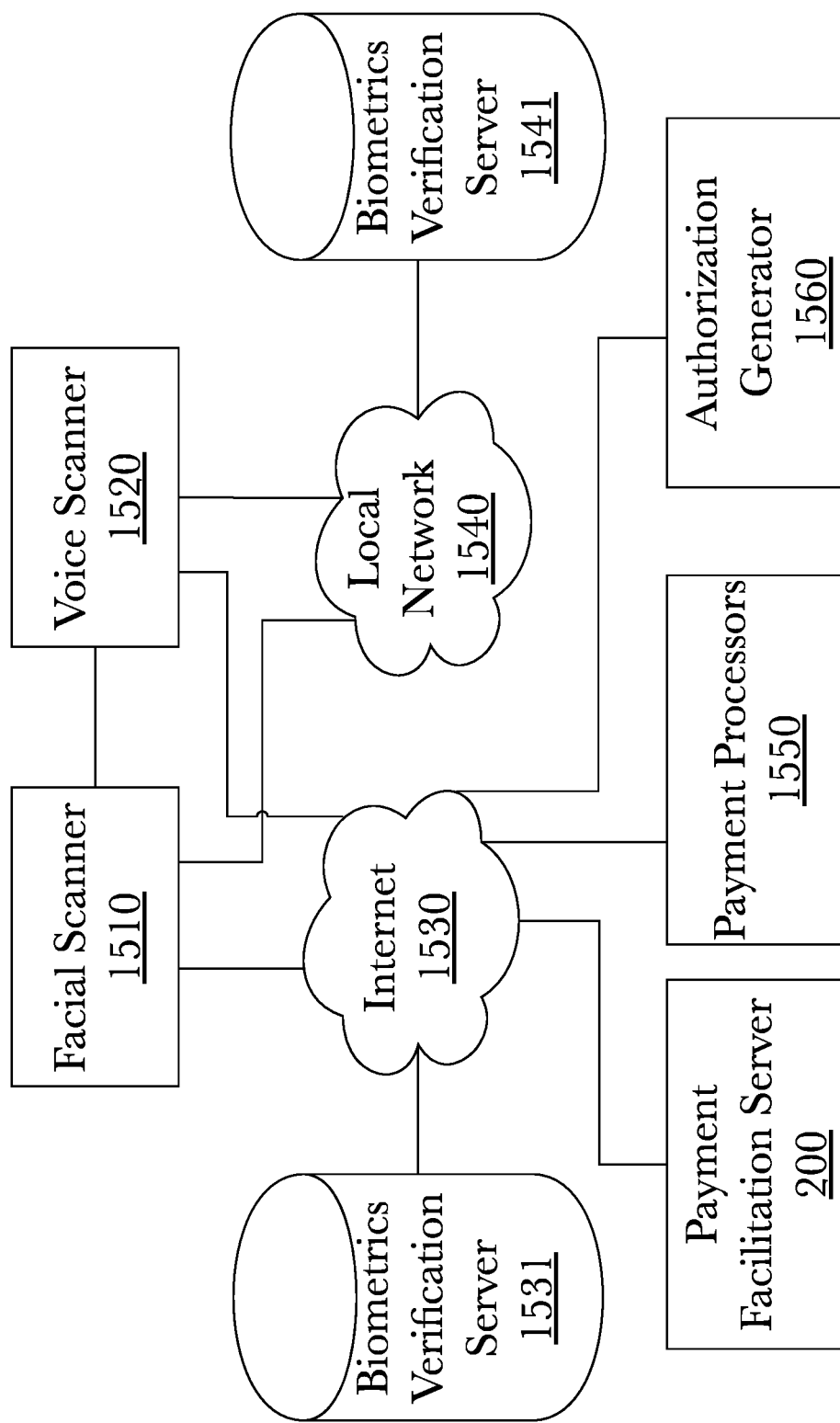
FIG. 15 is a block diagram illustrating an exemplary system architecture for a predictive pre-authorization system using biometric authentication.

FIG. 15 is a block diagram illustrating an exemplary system architecture for a zero-step authentication system using biometric authentication. A facial scanner 1510 such as a digital camera and Application-Specific Integrated Circuit ("ASIC"), or a digital camera connected to a personal computer, tablet, phone, or other computing device with appropriate software, may be connected to either or both of the internet 1530 or a local network 1540, sending authentication requests and video or image data, and receiving either a success or failure message, or a percentage similarity message regarding the match chance of a given customer to a stored set of data, from a biometrics verification server hosted over the internet 1531 or one hosted locally 1541. A voice scanner 1520 may operate similarly but rather than operating with a digital camera, the voice scanner 1520 operates with a microphone that may or may not be part of a digital camera (such as an embedded webcam that may be used for both the facial scanner 1510 as well as the voice scanner 1520), and may be connected to a separate ASIC or personal computer, tablet, phone, or other computing device, or may be connected to the same computing device that the facial scanner 1510 is connected to. The voice scanner 1520 may also, in a separate or in a joined network connection with the facial scanner 1510, be connected over either or both of the internet 1530 and a local network 1540 to a remote or local biometrics verification server 1531, 1541, for the purposes of sending received biometrics data including voice data to the servers, and receiving back a match to a user in the server's datastores. A singular or plurality of payment processors 1550 are accessible by either or both of the biometrics scanners 1510, 1520 and accompanying computer systems as applicable, such as VISA™, MASTERCARD™, PAYPAL™, or others, to allow the verification and execution of customer purchases with a payment facilitation server 200 as described in FIG. 2. Upon confirmation of identity from the biometrics verification server 1531, 1541, an authorization generator 1560 may retrieve: customer information stored within the payment facilitation server 200, business enterprise information (e.g. restaurant ticket and sales data, menu items and prices, specials, staff schedules, etc.) from a business enterprise database which may be stored locally on a physical device such as a hard drive or thumb drive, or stored remotely using cloud-based storage system, and mobile device data. The authorization generator 1560 determines the amount of money that should be pre-authorized for transactional purposes using subsets of the retrieved data as inputs into a machine learned predictive algorithm.

Figure 16:
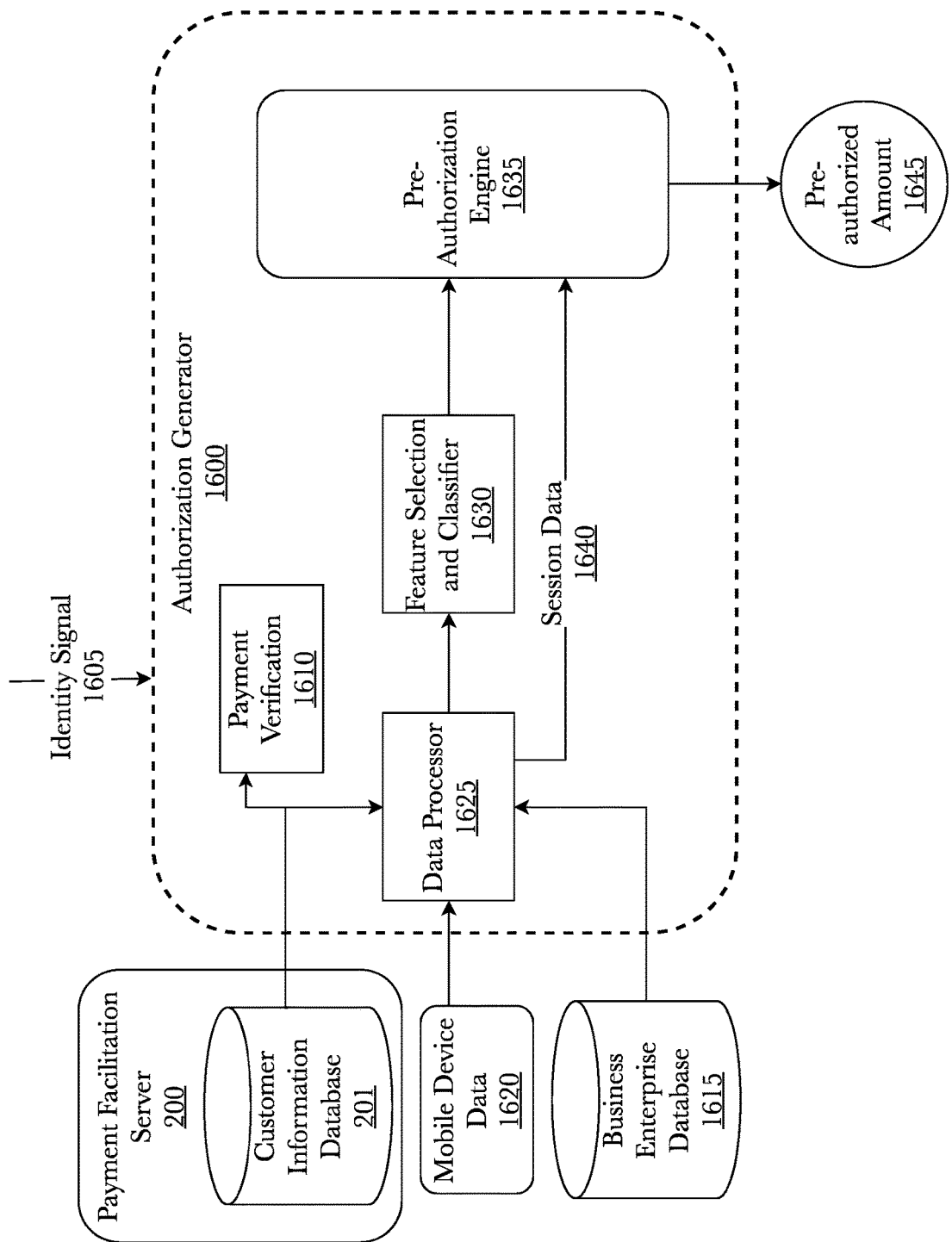
FIG. 16 is a block diagram illustrating an exemplary architecture for an aspect of predictive pre-authorization system, the authorization generator.

FIG. 16 is a block diagram illustrating an exemplary architecture for an aspect of predictive pre-authorization system, the authorization generator 1600. The authorization generator 1600 may use a variety of data to predict a pre-authorized transaction amount 1645. The process begins when the generator receives a confirmation of identity signal

1605 from a biometrics verification server 1531, 1541. The signal may contain a customer identifier that may be used to retrieve a subset of customer information data that corresponds to the identified customer. The customer information data is stored in a customer information database 201 located within a payment facilitation server 200 and may comprise customer details such as name, telephone number, device identifier, bank, debit, or credit card details, payment preferences, and customer defined account preferences such as pre-authorization increment and tipping defaults. The identified customer bank, debit, or credit details are sent to payment verification 1610 which verifies that customer payment accounts are active and that sufficient funds are available to facilitate a transaction. If payment verification 1610 determines a transaction cannot be completed (e.g. insufficient funds, account status, etc.) the authorization generator 1600 may stop execution and send a message to the waiter's mobile device alerting them that the transaction cannot be conducted; otherwise the authorization generator 1600 proceeds uninterrupted with its process.

The data processor 1625 may retrieve, ingest, clean, prepare, and otherwise manipulate data from a variety of data sources such as a customer information database 201, a business enterprise database 1615, and mobile device data 1620, among other data sources. In an embodiment for a restaurant use case, business enterprise data may comprise information including but not limited to, restaurant ticket and sales data, menu items and prices, specials, and employee schedules. Mobile device data 1620 may include location, text, voice, and social media data. The data processor 1625 performs a variety of pre-processing actions including but not limited to, deduplication, error correction, normalization, randomization, vectorization, filtering, and data type conversion. For example, some data may need to be translated to a .CSV file. Fully processed and prepared data is sent to the feature selection and classifier 1630 which may identify the features (i.e. variables) that are most pertinent to predicting a transaction amount and then use those features and the data to build, train, and test a classification model that can be used to predict a transaction amount. A few examples of possible identified features may include customer preferences, restaurant ticket, type of restaurant, group details, customer ticket, or time, among others. For more detailed information about the classifier 1630 and the machine learning algorithm see FIG. 17 below. Once a fully trained, tested, and evaluated classification model has been developed and is ready for practical applications, it is included in the pre-authorization engine 1635 which applies session data 1640 to the classification model. Session data 1640 refers to the subsets of data from the customer information database 201, the business enterprise database 1615, and mobile device data 1620 that are retrieved when a customer's biometric data has been verified. The session data 1640 is input into the machine learned predictive classification model and a pre-authorized transaction amount 1645 is generated.

Figure 17:
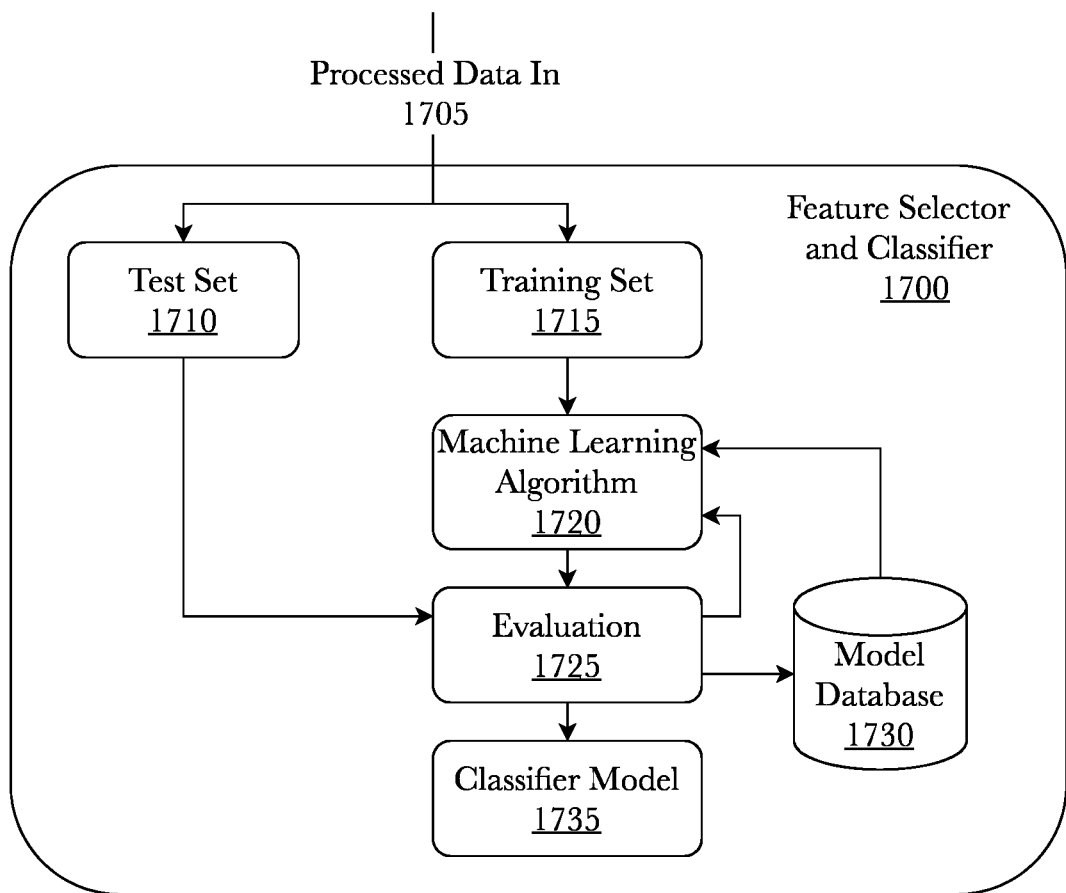
FIG. 17 is a block diagram illustrating an exemplary architecture for an aspect of predictive pre-authorization system, the feature selector and classifier, according to an embodiment.

FIG. 17 is a block diagram illustrating an exemplary architecture for an aspect of predictive pre-authorization system, the feature selector and classifier 1700. Pre-processed data 1705 enters the classifier 1700 and is divided into two different sets of data: a test set 1710 and a training set 1715. The training set 1715 is used as input into a machine learning algorithm 1720 to train and build a predictive classifier model 1735. According to an embodiment, the machine learning algorithm 1720 may be a neural network that utilizes deep learning techniques to build an accurate and applicable classification model that can predict a transaction amount. In other embodiments, the machine learning algorithm may be a supervised or unsupervised process. For example, supervised algorithms may include but is not limited to, linear, logistic, or polynomial regression, decision tree, or random forest. Some examples of unsupervised learning may include clustering, association analysis, and hidden Markov model.

The machine learning algorithm 1720, using the training set 1715 produces a model that can make predictions. The predictive results of the model are evaluated 1725 by comparing the results against the test set 1710 of data to check the accuracy of the model. If the results are not satisfactory, as measured against a predetermined model error threshold, then the model needs to be improved through further training. Each iteration of the model and its output are saved to a model database 1730 which stores model state information that allows the classifier 1700 to adjust the parameters of each iteration of the model until the results are satisfactory. As data is received by the system, the model is continuously trained and evaluated so that it accurately reflects current event data. A model that meets the threshold of accuracy is ready for predictive applications and is referred to as the classifier model 1735. This model is sent to the pre-authorization engine 1635 where it can make a prediction for a specific customer based upon a subset of customer data, business enterprise data, and mobile device data.

Figure 18:
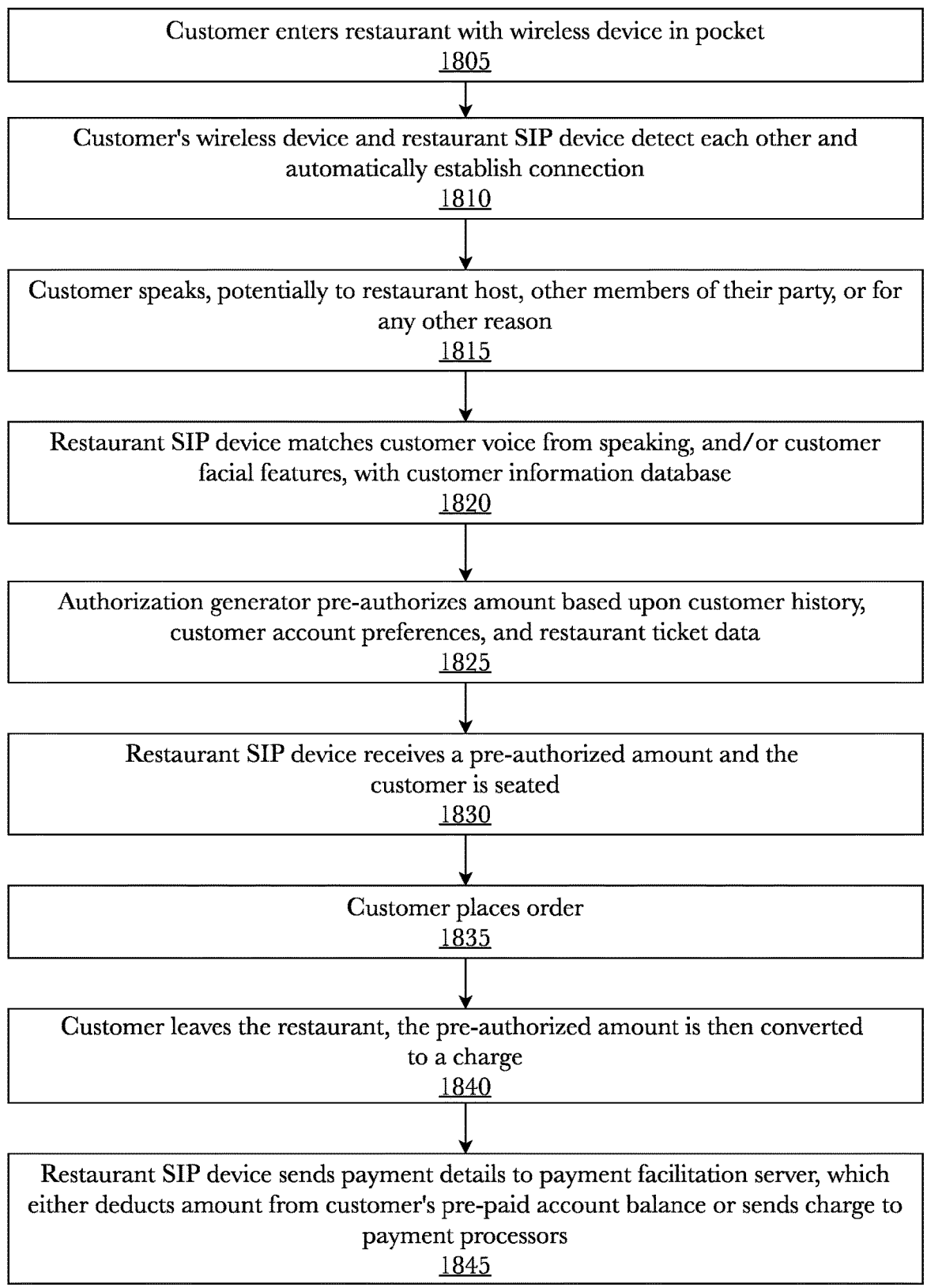
FIG. 18 is a flow diagram showing the steps of an exemplary method for predictive pre-authorization using biometrics and completion of a transaction.

FIG. 18 is a flow diagram showing the steps of an exemplary method for predictive pre-authorization using biometrics and completion of a transaction. When a customer enters a business establishment 1805, the customer's wireless device and business payment facilitation device detect each other and automatically establish connection 1810. The business payment facilitation device retrieves the customer device identifier (ID) and uses the customer device ID to retrieve customer information from customer information database located on a payment facilitation server 1815. The customer may speak verbally upon entering the restaurant or otherwise coming within sufficient range of a voice detection system, whether it is passive and unintrusive or the customer is encouraged such as from a sign in the doorway saying "please speak," either to themselves, to the host or hostess, to another member of their party, or to someone or something else 1815. This speech, or the customer's face as scanned passively without the user initiating any step of authentication themselves from a facial scanner, or some combination of the two, may then be utilized to match the customer's biometrics to data stored in a customer information database 1820 either locally or over the Internet. Upon completion of the biometric authentication, the authorization generator predicts a pre-authorized amount based upon customer history (e.g. customer's average ticket amount), customer account preferences (e.g. tipping defaults, incremental authorization limits), and restaurant ticket data (e.g. restaurant's average ticket amount) 1825. The restaurant SIP device receives a pre-authorized amount and the customer is seated 1830. The customer the places an order 1835. When the customer is done dining, they may simply stand up and leave the restaurant without further interaction with the restaurant staff. Upon leaving the restaurant the pre-authorized amount is converted into a charge 1840. When the customer leaves, the business payment facilitation device sends payment details to payment facilitation server, which either deducts amount from customer's pre-paid account balance or sends charge to payment processors

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
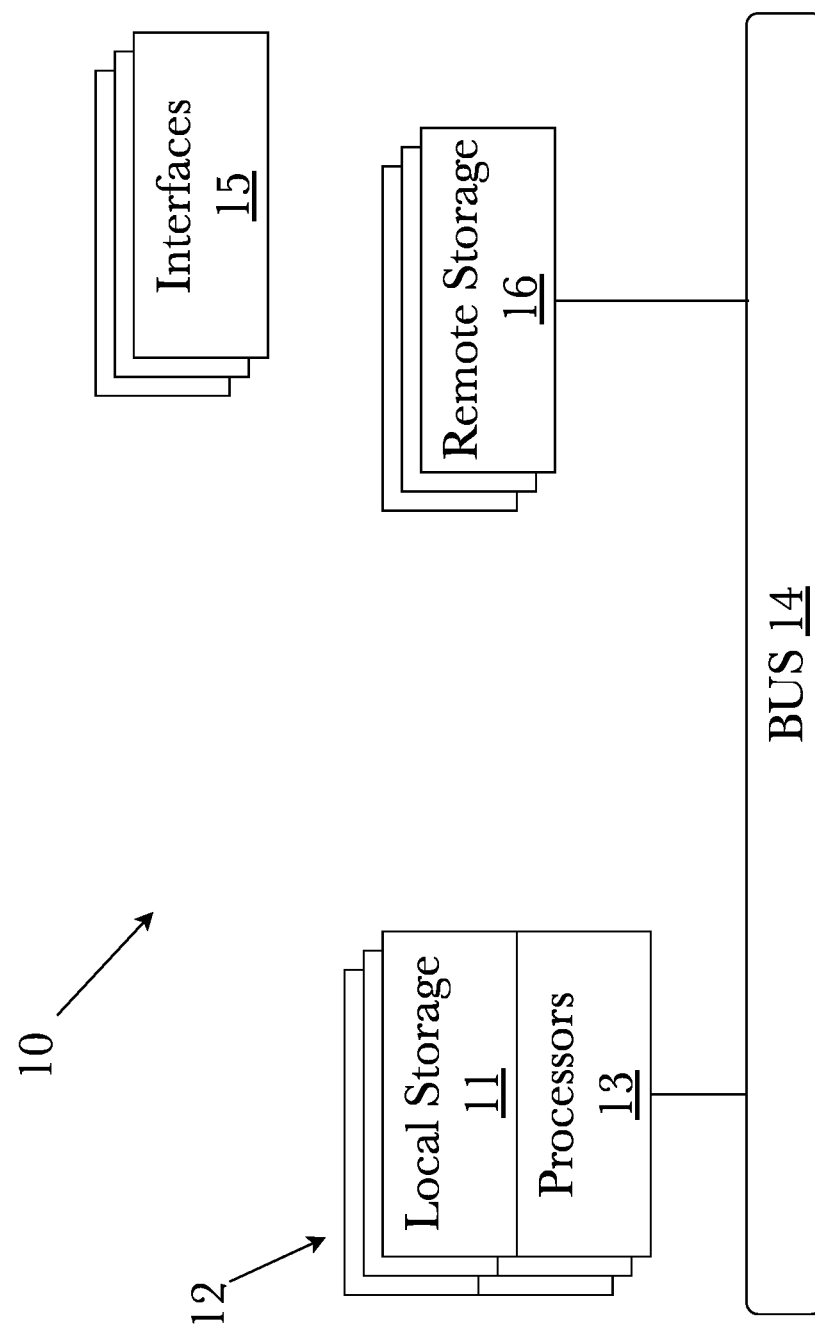
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
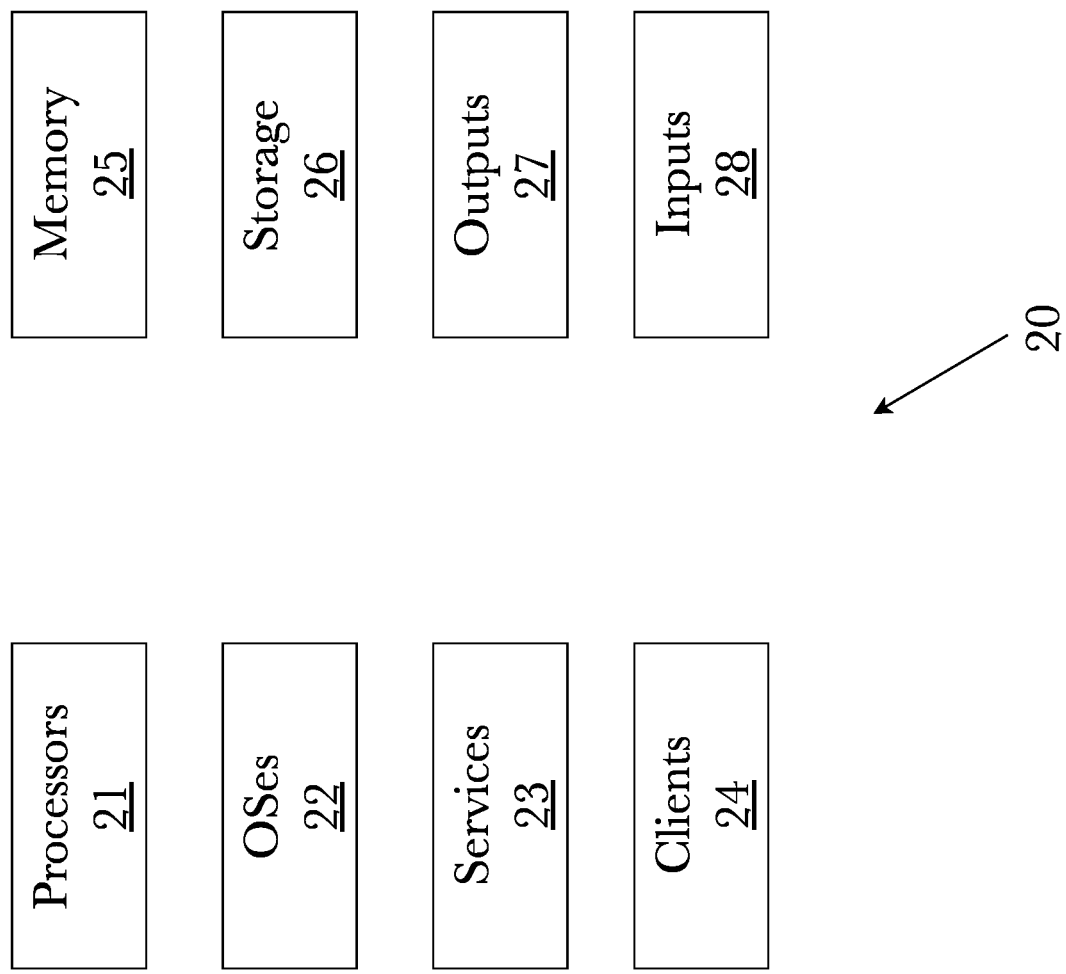
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
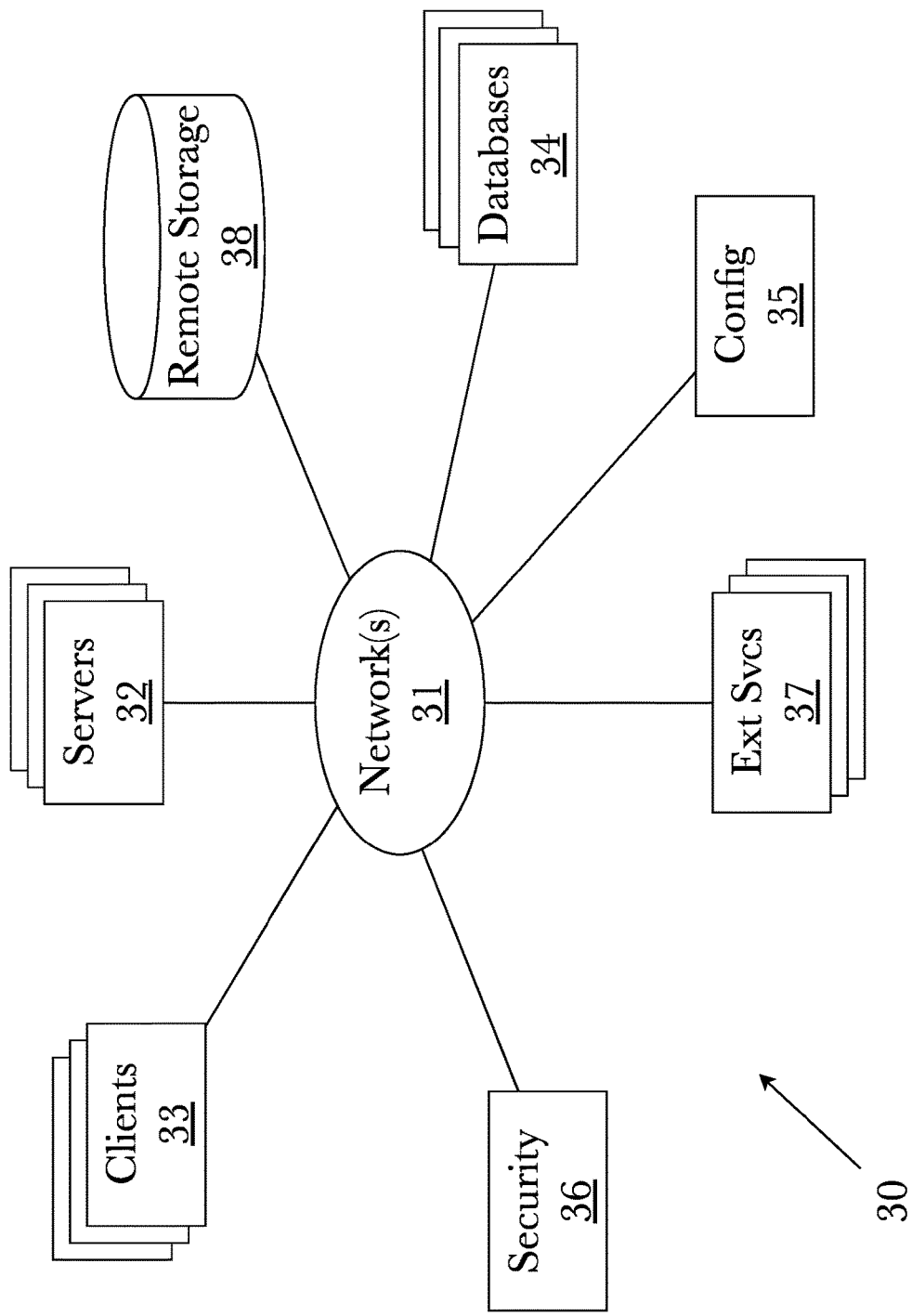
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
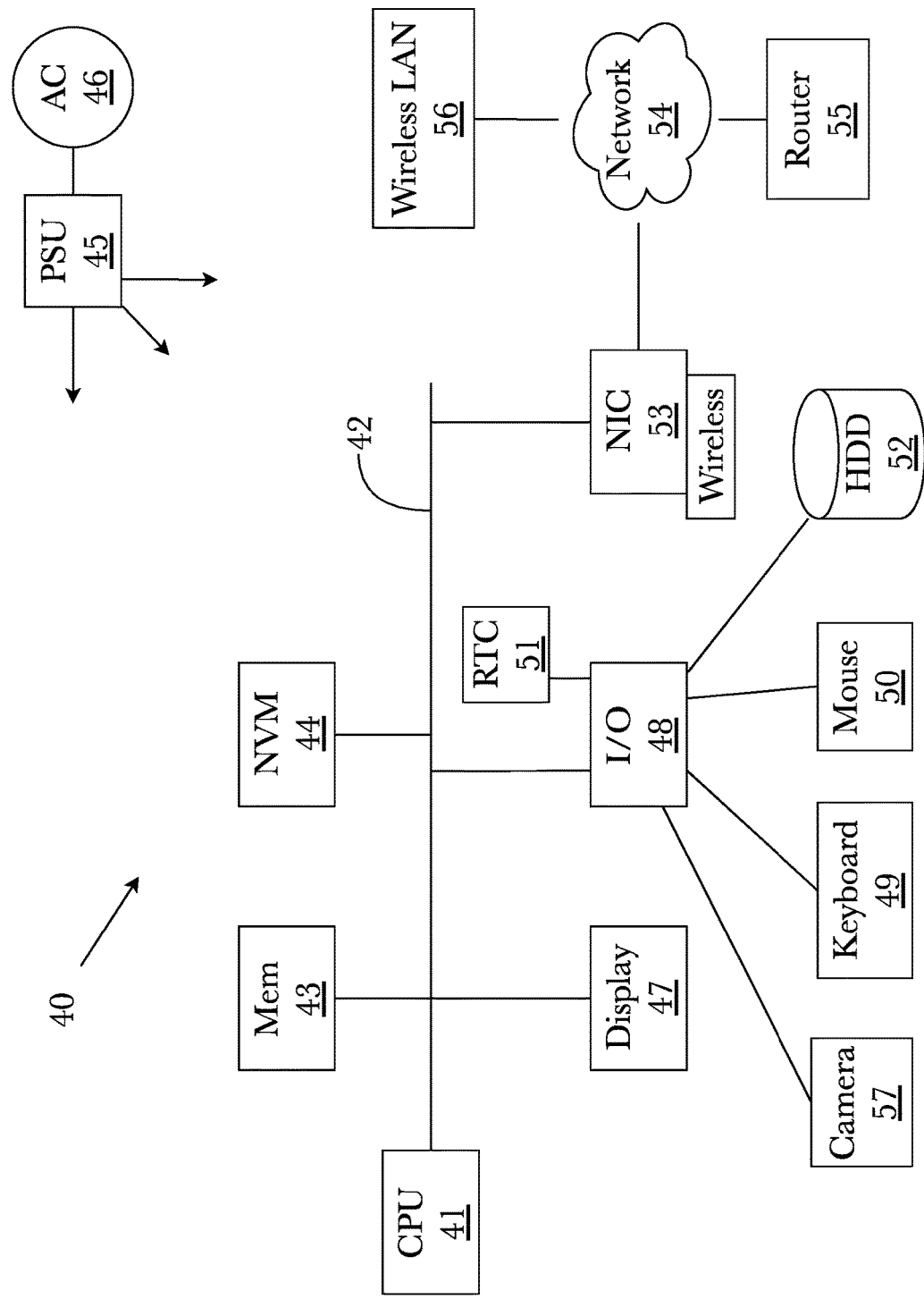
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for predictive pre-authorization of transactions using biometrics, comprising:
   a computing device comprising a memory, a processor, and a non-volatile data storage device;
   a customer information database on the non-volatile data storage device, the database comprising customer history data, the customer history data comprising customer receipt data, bank, debit, or credit card details, and customer preferences;
   a transactions database on the non-volatile data storage device, the database comprising sales data;
   a biometrics verification module comprising a first plurality of programming instructions stored in the memory, and operating on the processor, wherein the first plurality of programming instructions, when operating on the processor, cause the computing device to:
     receive audio data, or video data, or both;
     match received audio data, or video data, or both with stored biometric data to confirm an identity of a specific customer; and
     send a confirmation of identity signal to an authorization generator; and
   an authorization generator module comprising a first plurality of programming instructions stored in the memory, and operating on the processor, wherein the first plurality of programming instructions, when operating on the processor, cause the computing device to:
     receive the confirmation of identity signal from the biometrics verification module;
     retrieve a subset of the customer history data from the customer database that corresponds to the specific customer;
     retrieve a subset of the sales data from the transactions database;
     compute a customer average transaction amount using the customer receipt data from the subset of the customer history data;
     compute an average transaction amount using the sales data; and
     determine, using a machine-learned predictive algorithm, a pre-authorization amount using the customer average transaction amount, the sales average transaction amount, and the customer preferences from the subset of the customer history data as inputs into the machine-learned predictive algorithm.

2. The system of claim 1, further comprising a unified communications system which acts as a common intermediary device through which the payment facilitation device, the payment facilitation server, and registered wireless mobile device communicate.

3. A method for predictive pre-authorization of transactions using biometrics, comprising the steps of:
   storing customer information in a database, the customer information comprising:
      a list of registered wireless mobile devices;
      a device identifier for each registered wireless mobile device;
      a photograph of a customer associated with each registered wireless mobile device; and
      payment details for the customer associated with each registered wireless mobile device; and
   performing the following steps using a biometrics verification module, the biometrics verification module comprising a first memory, a first processor, and a first plurality of programming instructions:
      receiving audio data, or video data, or both;
      matching received audio data, or video data, or both with stored biometric data to confirm an identity of a specific customer; and
      sending a confirmation of identity signal to an authorization generator; and
   performing the following steps using an authorization generator module, the authorization generator module comprising a second memory, a second processor, and a second plurality of programming instructions:
      receiving the confirmation of identity signal from the biometrics verification module;
      retrieving a subset of the customer history data from the customer database that corresponds to the specific customer;
      retrieving a subset of the sales data from the transactions database;
      computing a customer average transaction amount using the customer receipt data from the subset of the customer history data;
      computing a sales average transaction amount using the sales data; and
      determining, using a machine-learned predictive algorithm, a pre-authorization amount using the customer average transaction amount, the sales average transaction amount, and the customer preferences from the subset of the customer history data as inputs into the machine-learned predictive algorithm.

4. The method of claim 3 further comprising the step of using a unified communications system as a common intermediary device through which the payment facilitation device, the payment facilitation server, and registered wireless mobile device communicate.

* * * * *